June 10, 1958   H. L. SPAUNBURG ET AL   2,838,237
REGISTER MECHANISM FOR DISPENSING APPARATUS
Filed Sept. 8, 1955   4 Sheets-Sheet 1

INVENTORS
HARVEY L. SPAUNBURG
GEORGE W. WHITE
BY Lindsey and Prutzman
ATTORNEYS

June 10, 1958  H. L. SPAUNBURG ET AL  2,838,237
REGISTER MECHANISM FOR DISPENSING APPARATUS
Filed Sept. 8, 1955  4 Sheets-Sheet 2
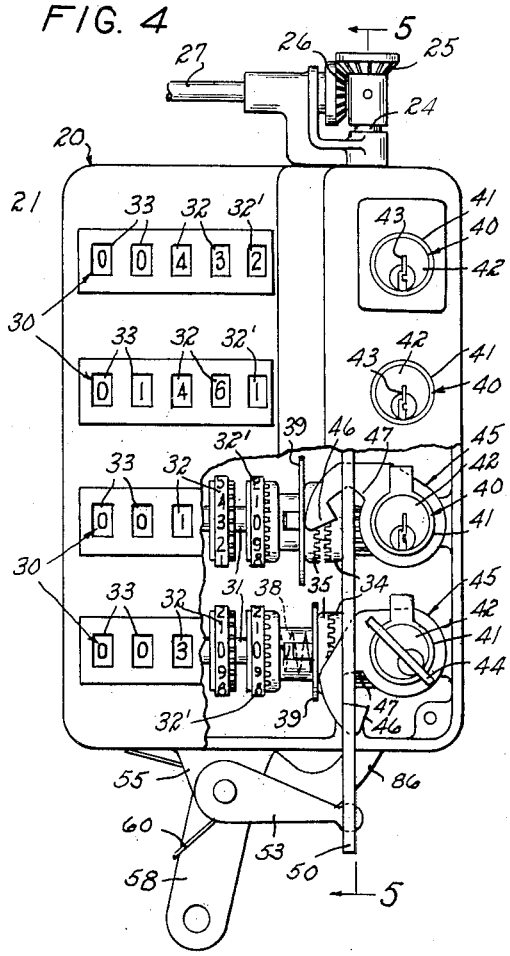
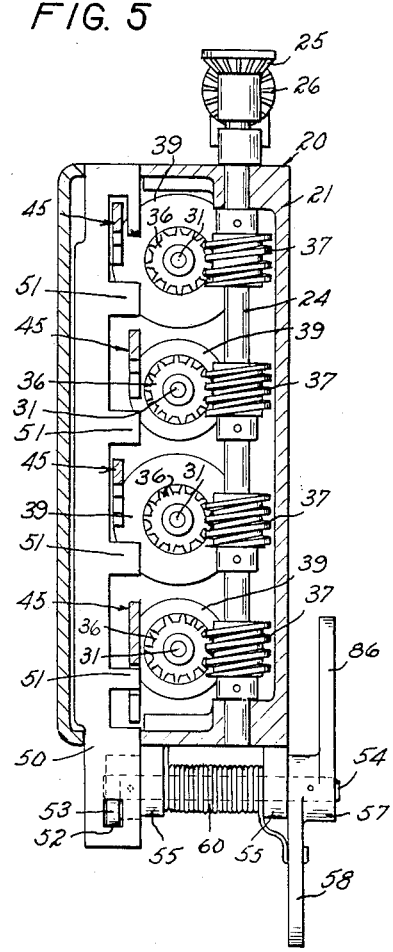
INVENTORS
HARVEY L. SPAUNBURG
GEORGE W. WHITE
BY Lindsey and Prutzman
ATTORNEYS June 10, 1958   H. L. SPAUNBURG ET AL   2,838,237
REGISTER MECHANISM FOR DISPENSING APPARATUS
Filed Sept. 8, 1955   4 Sheets-Sheet 3

INVENTORS
HARVEY L. SPAUNBURG
GEORGE W. WHITE
BY Lindsey and Prutzman
ATTORNEYS

June 10, 1958   H. L. SPAUNBURG ET AL   2,838,237
REGISTER MECHANISM FOR DISPENSING APPARATUS
Filed Sept. 8, 1955   4 Sheets-Sheet 4
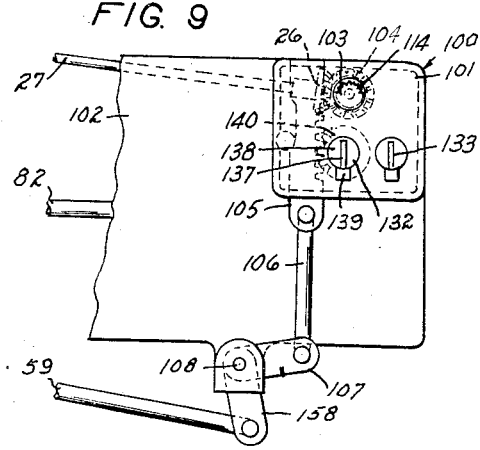
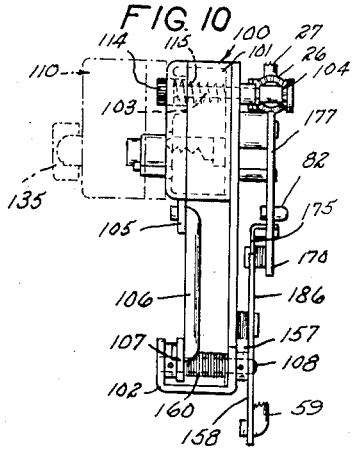
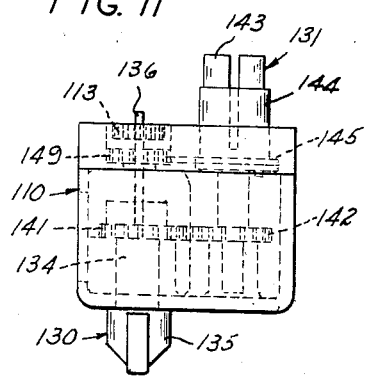
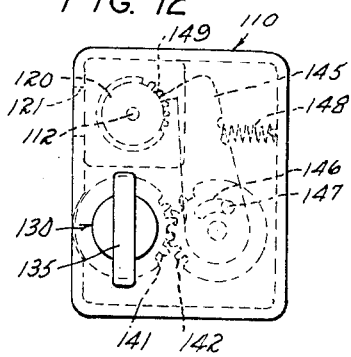
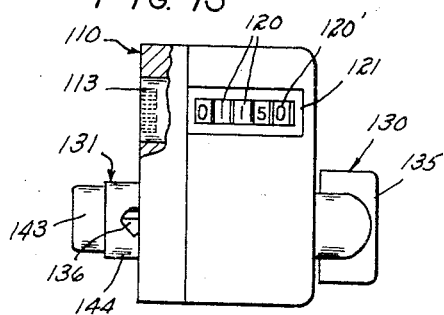
INVENTORS
HARVEY L. SPAUNBURG
GEORGE W. WHITE
BY *Lindsey and Prutzman*
ATTORNEYS

United States Patent Office 2,838,237
Patented June 10, 1958

2,838,237

REGISTER MECHANISM FOR DISPENSING APPARATUS

Harvey Lewis Spaunburg and George W. White, West Hartford, Conn., assignors to Veeder-Root Incorporated, Hartford, Conn., a corporation of Connecticut Application September 8, 1955, Serial No. 533,065

24 Claims. (Cl. 235—94)

The present invention relates generally to dispensing apparatus and relates, more particularly, to mechanism for separately registering the amounts dispensed by two or more operators. While the invention may have general utility, it is particularly adapted for use with registering and dispensing mechanism of the type disclosed and claimed in the copending application of Harvey N. Bliss, Serial No. 298,045 filed December 14, 1953, now abandoned.

It frequently is desirable when several attendants operate a single dispensing mechanism to maintain a record of the amounts dispensed by the individual attendants. It is preferred to accomplish this aim mechanically and automatically so that it does not impose an unnecessary burden on the operators, or materially interfere with the normal use of the dispenser, and also, so that there will be provided an accurate registration which cannot be tampered with or circumvented by the individual operators.

An aim of the present invention is to provide a compact registering mechanism which can be readily and easily mounted in the more modern types of commercially available dispensing apparatus so as to provide a registration of the amounts dispensed by the individual operators, which mechanism will be simple and convenient to operate without materially interfering with the proper or normal use of the dispensing apparatus. Included in this aim is the object of providing a registering mechanism which will function satisfactorily and accurately over long periods of time, which will not detract from the appearance of the dispensing mechanism, and which will be automatically conditioned for use whenever a dispensing operation is initiated by an individual operator.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Fig. 4 is an enlarged side view of the individual register with the cover partially cut away to show certain of the interior parts;

Fig. 5 is a cross sectional view taken along the line 5—5 of Fig. 4;

Fig. 6 is a front elevation of the connecting mechanism with the individual register shown in dotted lines, the parts being in the position when the main register of the dispensing apparatus has been reset and the individual register has been clutched in;

Fig. 7 is a view similar to Fig. 6 with the parts in the position when the pump motor has been turned on;

Fig. 9 is a fragmentary front view showing a connecting unit utilized in a second embodiment of the invention;

Fig. 10 is an end view of the mechanism shown in Fig. 9 and also showing in dotted lines an individual registering mechanism connected thereto;

Fig. 11 is a top view of the individual registering mechanism shown in dotted lines in Fig. 10;

Fig. 12 is a front view of the individual registering mechanism; and

Fig. 13 is an end view of the individual registering mechanism.

Figure 1:
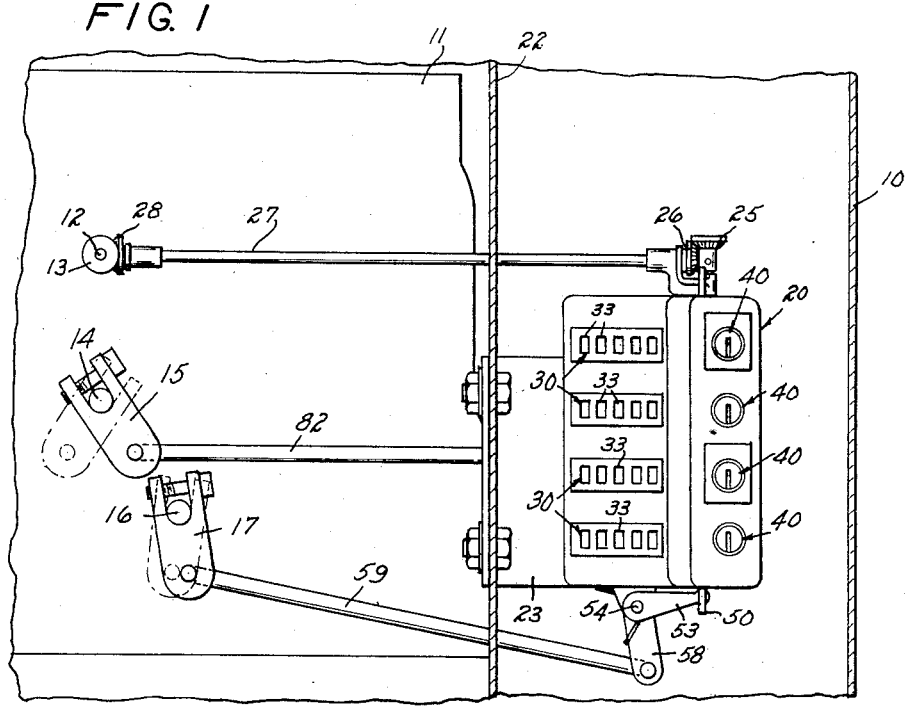
Fig. 1 is a fragmentary side view of a dispensing apparatus with the cover plates in cross section and showing one embodiment of the invention as attached to the dispensing apparatus.
Figure 2:
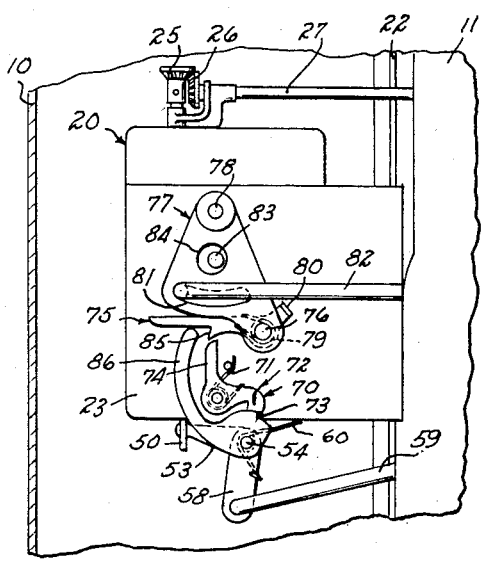
Fig. 2 is a fragmentary view similar to Fig. 1 but taken from the opposite side of the individual register.
Figure 3:
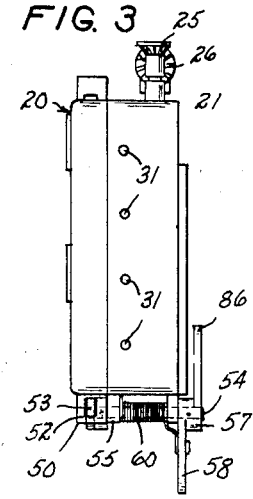
Fig. 3 is an end view of the register shown in Figs. 1 and 2.

Turning first to Figs. 1 and 2 of the drawings, the casing of a conventional gasoline dispensing apparatus is indicated at 10, and mounted within the casing 10 and shown in somewhat diagrammatic form is a register 11, which preferably is of the type shown in the above-mentioned Harvey N. Bliss application Serial No. 298,045, now abandoned. As will be understood, the register 11 is operated from a meter (not shown) for registering or counting the quantity of gasoline dispensed and also the cost thereof. In the specific embodiment shown in the drawings, the individual register of the present invention to be described hereinafter is adapted to register only one of these amounts, namely, the quantity or amount of gasoline dispensed although, as will be apparent, the registration could be of the cost of the gasoline dispensed or both.

For purposes of illustration, the register 11 is shown as having a take-off shaft 12 provided with a bevel gear 13 on the end thereof, which shaft is rotated in accordance with the quantity of gasoline dispensed, this shaft being in this particular register the shaft which is normally utilized to operate the usual totalizer counter of the register. The register 11 also has a shaft 14 which is connected to a suitable handle (not shown) adapted to be turned by the operator in order to begin a dispensing operation. By means not shown and not forming a part of the present invention, the turning of shaft 14 by the operator actuates the pump motor switch and also, when the register is of the type shown in said Bliss application, Serial No. 298,045, now abandoned, loads a resetting spring which provides the energy required to operate the resetting mechanism of the register. An arm 15 is clamped to the end of the shaft 14 to provide a connection to the individual register, to be described more particularly hereinafter. The position of the arm 15 shown in solid lines in Fig. 1 is the position at the end of a dispensing operation when the pump motor is turned off, whereas the dotted line position is the position during a dispensing operation with the pump motor turned on.

The shaft 16 will be referred to hereinafter, for convenience, as the reset shaft of the register for when this shaft is oscillated as by means of the lever 17 attached thereto, the main register 11 is reset to zero. For purposes of illustration, resetting of the register is deemed to be accomplished when the lever 17 is moved from the solid line position to the dotted line position shown in Fig. 1.

The individual register of the present invention in the embodiment of Figs. 1 to 8, is shown generally at 20 and comprises a housing 21 which is mounted on a frame member 22 of the dispensing apparatus by means of a bracket 23. Extending through the counter 20 and journaled in the top and bottom walls thereof is a main operating shaft 24 having a bevel gear 25 at its upper end which meshes with a bevel gear 26 on the end of a drive shaft 27. Drive shaft 27 extends to the main register 11 and has a bevel gear 28 at its outer end which meshes with the bevel gear 13 of the totalizer shaft 12 previously described so as to cause the main operating shaft 24 to turn in unison with the totalizer shaft 12 of the main register.

The counter 20 is provided with a plurality of individual sets of number wheels for registering the amount dispensed by the individual operators. In the specific embodiment there are shown four of these individual sets of number wheels, indicated generally as 30. Inasmuch as each set of counterwheels is identical, the same reference numerals will be used throughout. Each individual counter comprises a wheel supporting shaft 31 extending between the ends of the housing 21, and each wheel supporting shaft 31 has mounted thereon a plurality of number wheels 32. The number wheels 32 register with openings 33 in the front plate of the housing 21 whereby the same may be read. The number wheels of lowest order, which are indicated at 32', are adapted to be driven by a clutch comprising a fixed member 34 and an axially movable member 35, the clutch members being provided with teeth which intermesh when the members are brought into engaging relationship. A spring 38 is provided to urge the clutch members 34, 35 into engaging relationship. The remaining number wheels of higher order are rotated intermittently by the number wheel of lowest order by any usual transfer mechanism (not shown). The fixed clutch member 34 is rotatably mounted on the wheel supporting shaft 31 and has fixed thereto at its right-hand end, as viewed in Fig. 4, a worm wheel 36 which meshes with a worm 37 on the main drive shaft 24, the main drive shaft 24 being provided with a worm 37 for each of the clutch members 34.

The individual clutches are normally maintained in disengaged position by a series of key-operated locks 40, one for each of the individual counters 30. Each of the locks 40 comprises a fixed sleeve 41 and a rotatable cylinder 42 within the sleeve 41 and having a keyhole 43. The arrangement is such that when a suitable key, as indicated at 44, is inserted into the keyhole 43, the same will release the tumblers holding the cylinder and permit the turning thereof. Fixed to each of the cylinders 42 is a cam 45 in the form of a hook-like arm having a nose portion 46 which, when the lock is in locked condition, engages against a plate 39 on the movable clutch member 35 and holds the same in disengaged position. However, when the lock is moved to the unlocked position shown in the lowermost lock of Fig. 4, the cam 45 permits the clutch members 34 and 35 to engage. As will be understood, each of the operators will be provided with a key 44 which will operate one of the locks 40 and, when this key is inserted into the lock and turned as illustrated in the bottom lock of Fig. 4, the clutch will be engaged and the individual counter will be driven through the main drive shaft 24 and connecting rod 27 from the totalizer shaft 12 of the main register.

The operation of the cam 45 by the turning of the key 44 also operates a slide 50, which is in the form of a notched plate extending vertically of the housing 21 and which is mounted for sliding movement. As best shown in Fig. 5, the slide 50 is provided with a series of fingers 51 which extend below each of the cams 45 and which are adapted to engage the inner edge 47 of the cam to cause the slide 50 to move downwardly when the lock is turned to unlocking position. When the slide 50 has been moved downwardly by one of the cams 45, the unlocking of any of the other individual counters is prevented because the fingers 51 will be in obstructing position relative to the nose portion 46 of the other cams. Thus it is impossible for more than one individual counter to be unlocked or placed in counting condition at the same time.

The lower end of the slide 50 is notched at 52 to receive the end of a lever 53 which is fixed to one end of a stub shaft 54 which is journaled in lugs or ears 55 depending from the bottom of the housing 21. The opposite end of the stub shaft 54 has fixed thereto a hub 57 on which is formed a downwardly projecting arm 58 for receiving one end of a connecting rod 59 which is attached at the end of the lever 17 of the reset shaft 16. Thus when the slide is in the upward position, the lever 17 is in the solid line position shown in Fig. 1, and when the slide is moved downwardly as when one of the locks has been operated, the lever arm 17 is moved to the dotted line position shown in Fig. 1, causing resetting of the main register. A spiral spring 60 is mounted on the stub shaft 54 with one end in engagement with the housing 21 and the other end in engagement with the arm 58 to urge the stub shaft 54 in a counterclockwise direction as viewed in Fig. 4, thus tending to return the slide 50 to original position.

Figure 6:
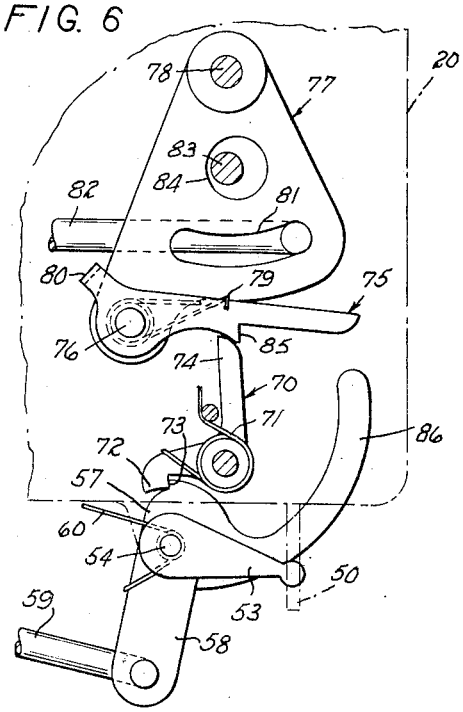
Figure 7:
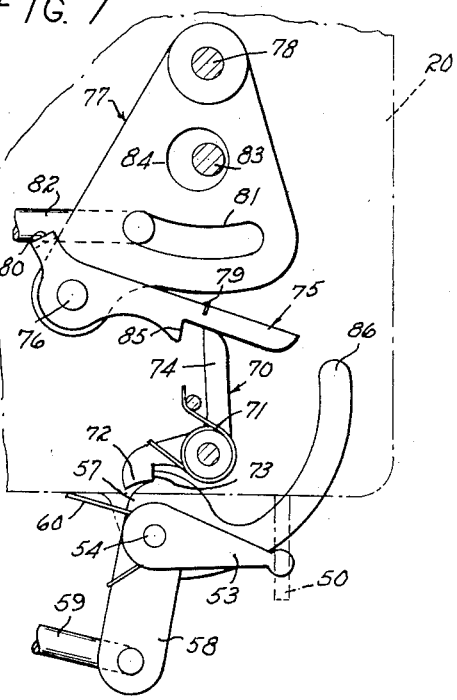
Figure 8:
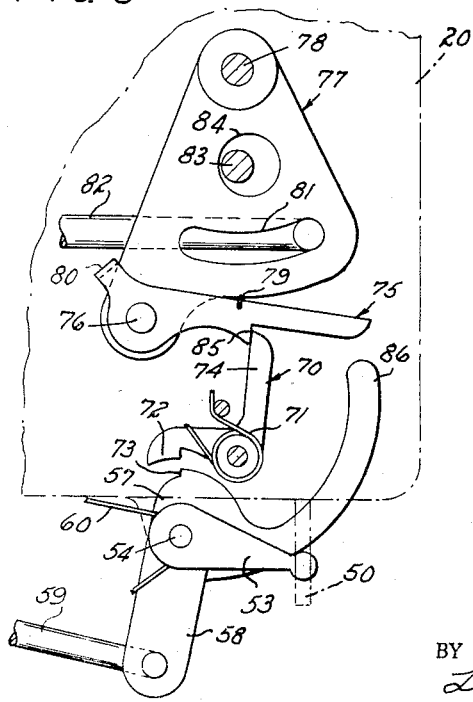
Fig. 8 is a view similar to Fig. 6 when the motor has been turned off.

As best shown in Figs. 2, 6, 7 and 8, there is mounted on the back of the housing 21 an L-shaped latch arm 70 which is urged in a counterclockwise direction as viewed in Figs. 6 to 8 by a spring 71. A nose 72 on the latch arm 70 is adapted to engage against a shoulder 73 on the hub 57 when the stub shaft 54 has been turned to the position shown in Fig. 6 of the drawings, thus normally preventing the operator from returning the individual counter to locked condition after an unlocking operation. Cooperating with the upwardly extending arm 74 of the latch 70 is a pawl 75 which is pivotally mounted at 76 on the lower end of a generally triangularly shaped plate 77, which in turn is pivotally mounted at 78 on the housing 21. The pawl 75 is urged toward the latch arm 70 by a spring 79 but the movement is limited by means of an inturned ear 80 which will engage the edge of the plate 77.

The triangularly shaped plate 77 is provided with an arcuate notch 81 for receiving one end of a connecting rod 82 which is connected at its other end to the lever 15 mounted on the shaft 14 which, as previously mentioned, is actuated when the pump motor switch is operated. When the pump motor switch is turned off, the end of the connecting rod is at the right-hand end of the arcuate notch 81 as shown in Fig. 6 of the drawings. When the pump motor switch is turned on, which occurs when the lever 15 is moved from the solid line position to the dotted line position shown in Fig. 1, the opposite end of the connecting rod moves to the left-hand end of the arcuate notch 81 as shown in Fig. 7, causing limited pivoting movement of the triangular plate 77. The arcuate notch 81 provides a lost motion connection whereby movement will not be imparted to the triangular plate 77 until the end of the movement required to turn the pump motor switch on and off. Excessive movement of the triangular plate 77 is prevented by a post 83 on the rear of the housing 21 which extends through an enlarged opening 84 centrally of the triangular plate 77.

As best shown in Fig. 7 of the drawings, the movement of the triangular plate 77 in a clockwise direction, which occurs when the pump motor switch is turned from the off to the on position, will move the pawl 75 to a position where the shoulder 85 will clear the upwardly extending arm 74 of the latch arm 70, thus conditioning the mechanism so that when the pump motor switch is turned off, as shown in Fig. 8 of the drawings, the shoulder 85 will engage the arm 74 and move the latch arm 70 to the unlatching position with the nose 72 withdrawn from the shoulder 73, thus permitting the counter to be returned to locked condition.

When the operator returns the counter to original locked position, which permits the stub shaft 54 to turn in a counterclockwise direction as viewed in Figs. 6–8 under the influence of spring 60, a finger 86 on the hub 57 will engage against the end of the pawl 75 as best shown in Fig. 2 of the drawings, thus unlatching the pawl 75 from the latch arm 70 and thus returning the mechanism to the original condition.

It is believed that the operation of the embodiment of the invention shown in Figs. 1 to 8 of the drawings will be apparent from the foregoing description together with the following explanation. Assuming that the pump motor is turned off and an individual operator wishes to perform a dispensing operation, his first step will be to insert his individual key in the lock of the counter assigned to him and turn the key. Turning the key will cause his individual counter to be clutched into the main operating shaft and also by moving the slide 50 will actuate the connecting rod 59 and reset the main register. Since commercially available registers of the type used in gasoline dispensing apparatus are provided with an interlock to prevent the motor from being turned on until the register is reset, it follows that the operator must perform the first step just referred to before he can turn on the pump motor and begin a dispensing operation. The operator will then turn on the pump motor and thereafter, as long as the pump motor is turned on, the operator cannot remove his key and thus declutch his counter from the main operating shaft (this being prevented by the mechanism in the position shown in Fig. 7) and therefore any liquid dispensed will will be accurately registered on the operator's individual counter. As soon as dispensing is completed and the motor is turned off, however, the operator can again lock his counter and withdraw his key, thus completing the cycle.

In the embodiment just described the individual counter units 30 are permanently mounted in the dispensing apparatus and each of the operators is merely provided with a key for use with the individual set of counter wheels assigned to such operator. In the embodiment shown in Figs. 9 to 13 of the drawings, the individual counter units are removable and each operator is provided with a complete unit which he must attach to the dispensing apparatus when operating the same.

Turning to Figs. 9 and 10 of the drawings, there is shown a connecting or base unit, indicated generally at 100, which comprises a housing 101 which is fastened to a plate 102, which in turn is mounted on the pump housing. The base unit 100 has a drive shaft 103 extending from front to back of the housing and provided with a bevel gear 104 which meshes with the bevel gear 26 on connecting shaft 27 previously described, which in turn is actuated by the totalizer shaft 12 of the main register. The base unit 100 also has a vertically movable slide 105 in the form of a rack which has attached thereto at its lower end a connecting link 106 which is attached to the lever arm 107 which is journaled in the bottom of the plate 102. The opposite end of the shaft 108 has fixed thereto a hub 157, arm 158, spring 160 and finger 186 which are duplicates of and serve the same function as the hub 57, arm 58, spring 60 and finger 86 previously described in connection with the first embodiment. Also mounted on the rear of plate 102 is a latch arm 170, pawl 175 and plate 177 which are identical with the latch arm 70, pawl 75 and plate 77 previously described.

An exemplary portable individual counter unit, which is adapted to be mounted on the base unit 100, is shown in dotted lines in Fig. 10 and is shown in detail in Figs. 11, 12 and 13. This portable counter unit comprises a housing 110 having a number wheel supporting shaft 112 mounted horizontally in the upper left portion of the housing 110 and having on its rear end a coupling 113 in the form of an internal annular gear which is adapted to engage on the pinion 114 mounted on the forward end of the drive shaft 103. The drive shaft 103 is preferably formed in a telescoping manner so that, in the event the coupling 113 and pinion 114 are not in exact meshing condition when the portable counter is placed on the base unit 100, the pinion 114 will move inwardly. A spring 115 urging the pinion 114 in a forward direction will insure the engagement of the coupling 113 and pinion 114 as soon as any turning movement is imparted to the drive shaft 103.

Mounted on the wheel supporting shaft 112 are a plurality of number wheels 120 which register with the window 121 on the side of the housing 110. The number wheel of lowest order 120' is fixed to the shaft 112, while the remaining number wheels are rotatably mounted on the shaft and are advanced intermittently by the usual transfer gearing (not shown). The portable unit is provided with a key mechanism indicated generally at 130 and a lock mechanism indicated generally at 131 for co-operation with a lock mechanism 132 and a key 133, respectively, which are mounted on the base unit 109. The key mechanism 130 comprises a rotatable barrel 134 having an external knob 135 by which the same may be turned by the operator. The inner end of the barrel has fixed thereto a rearwardly extending key 136. The key 136 is adapted to enter the keyhole 137 of the lock 132, the keyhole 137 being formed in a cylinder 138 which is mounted in a sleeve 139. The cylinder 138 is adapted to be released from the stationary sleeve 139 when the key 136 is inserted therein so that it can turn when the operator turns the knob 135 and hence the key 136. The cylinder 138 has fixed thereto a pinion 140 for operating the rack 105 when the cylinder 138 is turned.

The barrel 134 also has fixed thereto a gear 141 which meshes with a gear 142 on the sleeve 143 of the lock mechanism 131. The sleeve is normally held stationary by a cylinder 144 which is released from the sleeve 143 when the key 133 is inserted therein. Pivotally mounted on the cylinder 144 is a locking pawl 145 which normally engages with external teeth 149 on coupling 113 and thus prevents turning of the registering mechanism except when the portable unit is connected to the base unit. A lost motion connection consisting of the arcuate slot 146 and pin 147 causes the pawl 145 to disengage when the gear 142 is turned but insures that it will not be disengaged until the very end of the locking movement. The locking pawl is biased into engaging position by means of a spring 148.

It thus will be seen that, when the portable counter unit is placed in proper position on the base unit 100, the wheel supporting shaft 112 will become engaged with the drive shaft 103 and the key 136 will enter the lock mechanism 132, while the key 133 will enter the lock mechanism 131. Upon the turning of the operating knob 135, the key 130 will be turned in the lock 132, while the lock 131 will be rotated relative to the key 133, thus effectively securing the portable unit in operating position on the base unit. The turning of the knob 135, causing the portable unit to be locked to the base unit 100, also will cause operation of the rack 105 which, as previously described, will cause the main register to be reset, and at the same time the locking pawl 145 is turned to disengaging position.

It is believed that the operation of the modification of the present invention shown in Figs. 9 to 12 will be readily understood from the foregoing description taken in connection with the following explanation. Assuming that the pump motor has been turned off and the main register has not been reset, and an operator wishes to perform a dispensing operation, the first step for the operator to perform will be to connect his portable counter unit to the base unit 100 by placing the same in operative position and turning the knob 135. This, of course, locks the portable unit to the base unit and, by operating the rack 105, causes resetting of the main register. Since the operator cannot now unlock the portable unit and remove it from the base unit because of the latch arm 170, the only operation now available to the operator is to turn on the pump motor by actuating the lever 15 of shaft 14 mounted on the main register. It will be understood that because of the usual interlock provided in the dispensing mechanism, the operator could not turn on the pump motor until the main register was reset. Actuation of arm 15 causes the pawl 175 to move into engaging position with the latch arm 170, so that when the pump motor switch is again turned off as at the end of a dispensing operation, the latch arm 170 will be released, permitting the operator to remove the portable counter unit. During the dispensing operation, the individual counter will be turned in unison with the main register by reason of the drive through the totalizer shaft 12 thus registering the amount dispensed by the individual operator.

It thus will be seen that in both embodiments of the invention a dispensing operation can be carried out only when an individual counter assigned to the individual operator is connected to the main register and thus there is provided an accurate count of the quantity of gasoline dispensed by the individual operators. The mechanism in both embodiments is of compact size and can readily be attached to present dispensing mechanisms without materially interfering with the normal operation thereof or without detracting from its appearance.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim:

1. In dispensing apparatus of the type having a pump, a pump motor for driving the pump, a meter connected to the outlet of the pump, a main register driven by the meter having a movable resetting member, and an interlock to prevent operation of the pump motor until after the actuation of the resetting member, the combination comprising an individual counter, and key operated means for simultaneously actuating the movable resetting member and connecting the individual counter to the main register drive.

2. In dispensing apparatus of the type having a pump, a pump motor for driving the pump, and a main register driven by the meter having a movable resetting member, the combination comprising an individual counter, a clutch for connecting the individual counter to the main register drive, and a key operated element mechanically connected to the clutch and movable resetting member for simultaneously engaging the clutch and actuating the movable resetting member of the main register.

3. The combination set forth in claim 1 wherein the individual counter is removable as a unit from the dispensing apparatus.

4. In dispensing apparatus of the type having a pump, a pump motor for driving the pump, a meter connected to the outlet of the pump, a main register driven by the meter having a movable resetting member, and an interlock to prevent operation of the pump motor until after actuation of the resetting member, the combination comprising a plurality of individual counters, and key operated means for simultaneously connecting a selected individual counter to the main register drive and actuating the movable resetting member of the main register.

5. In dispensing apparatus of the type having a pump, a pump motor for driving the pump, a meter connected to the outlet of the pump, and a main register driven by the meter having a movable resetting member, the combination comprising an individual counter, a clutch for connecting the individual counter to the main register drive, rotary means for engaging the clutch, a rack connected to the movable resetting member of the main register, a pinion for actuating the rack, and a key for simultaneously operating the rotary means and the pinion.

6. In dispensing apparatus of the type having a pump, a pump motor for driving the pump, a meter connected to the outlet of the pump, and a main register driven by the meter having a movable resetting member, the combination comprising a plurality of individual counters mounted on the dispensing apparatus, a clutch associated with each individual counter for connecting the same to the main register drive, key operated means for actuating each clutch, and an interlock operated by unlocking movement of a selected key operated means for preventing unlocking of the remaining key operated means.

7. In dispensing apparatus of the type having a pump, a pump motor for driving the pump, a meter connected to the outlet of the pump, and a main register driven by the meter having a movable resetting member, the combination comprising a bank of individual counters mounted on the dispensing apparatus, a clutch associated with each individual counter for connecting the same to the main register drive, a slide extending between the individual counters, key operated means associated with each counter for simultaneously actuating the clutch and moving the slide, and means on the slide operative when the slide has been moved by a selected key operated means for preventing operation of the remaining key operated means.

8. In dispensing apparatus of the type having a pump, a pump motor for driving the pump, a meter connected to the outlet of the pump, and a main register driven by the meter having a movable resetting member, the combination comprising an individual counter, a clutch for connecting the individual counter to the main register drive, a stop for preventing rotation of the individual counter, and key operated means for simultaneously engaging the clutch and releasing the stop.

9. In dispensing apparatus of the type having a pump, a pump motor for driving the pump, a main register driven by the outlet of the pump, a main register driven by the meter having a movable resetting member, and an interlock to prevent operation of the pump motor until after actuation of the resetting member, the combination comprising a base having a coupling member connected to the main register drive and a movable member connected to the movable resetting member of the main register, and a removable counter unit having a drive shaft arranged to be engaged by the coupling member and a manual actuating member for engaging the movable member.

10. In dispensing apparatus of the type having a pump, a pump motor for driving the pump, a meter connected to the outlet of the pump, and a main register driven by the meter having a movable resetting member, the combination comprising a base unit having a coupling member connected to the main register drive and a rotatable member operatively connected to the movable resetting member of the main register, and a portable counter unit having a drive shaft arranged to be engaged by the coupling member, key means for locking the removable counter unit on the base unit, and manually operable means for simultaneously actuating the key means and the rotatable member.

11. In dispensing apparatus of the type having a pump, a pump motor for driving the pump, a meter connected to the outlet of the pump, and a main register driven by the meter having a movable resetting member, the combination comprising a base unit having a coupling member connected to the main register drive, an outwardly extending fixed key on the base unit, and a key operated rotatable member on the base unit operatively connected to the resetting member of the main register, and a removable counter unit adapted to be placed on the base unit having a drive shaft engageable with the coupling, a key released manually operable member on the removable counter unit adapted to receive said fixed key on the removable counter unit, and a key adapted to enter said key operated rotatable member operatively connected to the manually operable member.

12. In dispensing apparatus of the type having a pump, a pump motor for driving the pump, a pump motor switch, a movable switch actuating member for actuating the pump motor switch, a meter connected to the outlet of the pump, and a main register driven by the meter having a movable resetting member, the combination comprising a key operated lever connected to the resetting member, a catch for holding the last-named lever in actuated position, and releasing means for the catch connected to the switch actuating member.

13. In dispensing apparatus of the type having a pump, a pump motor for driving the pump, a pump motor switch, a movable switch actuating member for actuating the pump motor switch, a meter connected to the outlet of the pump, and a main register driven by the meter having a movable resetting member, the combination comprising a first element connected to the resetting member of the register mounted for movement between an actuated position and a retracted position, key operated means for moving the element, holding means biased into engagement with the element to retain it in actuated position, a second movable element connected to the switch actuating member, and means on the second element for releasing the holding means when the switch actuating member is moved to open switch position.

14. In dispensing apparatus of the type having a pump, a pump motor for driving the pump, a pump motor switch, a movable switch actuating member for actuating the pump motor switch, a meter connected to the outlet of the pump, and a main register driven by the meter having a movable resetting member, the combination comprising a lever connected to the resetting member of the register mounted for oscillating movement between an actuated position and a retracted position, key operated means for reciprocating the lever, a pivotally mounted pawl biased for latching engagement with the lever when the lever is in actuated position, a second lever connected to the switch actuating member and mounted for oscillating movement between an open switch position and a closed switch position, and a pawl on the second lever for releasing the first-named pawl when the second lever is moved to switch open position.

15. In dispensing apparatus of the type having a pump, a pump motor for driving the pump, a pump motor switch, a movable switch actuating member for actuating the pump motor switch, a meter connected to the outlet of the pump, and a main register driven by the meter having a movable resetting member, the combination comprising an individual counter, key operated means for simultaneously actuating the movable resetting member and connecting the individual counter to the main register drive, holding means for retaining the key operated means in actuated position, and means connected to the switch actuating member for releasing the holding means.

16. In dispensing apparatus of the type having a flow establishing means, a flow measuring means, a flow control element, a register of the type having resetting means, and an interlock to prevent operation of the flow control means until after actuation of the resetting means, the combination comprising a plurality of individual counters, key operated means connected to the resetting means of the register to initiate operation thereof, means responsive to movement of the key operated means for connecting the selected individual counter to the main register drive, and means responsive to movement of the flow control element to prevent disconnection of the last named means while the flow control element is in flow producing position.

17. In dispensing apparatus of the type having a flow establishing means, a flow measuring means, a flow control means, a register of the type having resetting means, and an interlock to prevent operation of the flow control means until after actuation of the resetting means, the combination comprising a plurality of individual counters, key operated clutch means for connecting a selected individual counter with the main register drive, means responsive to movement of the key operated clutch means connected to the resetting means of the register to initiate resetting thereof, holding means for retaining the clutch means in engaged position, and means connected to the flow control means for releasing the holding means at the end of a dispensing operation.

18. In dispensing apparatus of the type having a pump, a pump motor for driving the pump, a pump motor switch, a movable switch actuating member for actuating the pump motor switch, a meter connected to the outlet of the pump, a main register driven by the meter having resetting means, and an interlock to prevent operation of the pump motor switch until after actuation of the resetting means, the combination comprising a plurality of individual counters, key operated means including a clutch for connecting a selected individual counter to the main register drive, means responsive to actuation of the key operated means connected to the resetting means of the register to initiate resetting thereof, holding means for retaining the key operated means in clutch engaging position, and means connected to the switch actuating member for releasing the holding means when the pump motor switch is turned off.

19. In dispensing apparatus of the type having a pump, a pump motor for driving the pump, a pump motor switch, a movable switch actuating member for actuating the pump motor switch, a meter connected to the outlet of the pump, and a main register driven by the meter having a movable resetting member, the combination comprising a plurality of individual counters, key operated means for simultaneously connecting a selected individual counter to the main register drive and actuating the movable resetting member of the main register, a catch for retaining the key operated means in actuated position, and means connected to the switch actuating member for releasing the catch.

20. In dispensing apparatus of the type having a pump, a pump motor for driving the pump, a pump motor switch, a movable switch actuating member for actuating the pump motor switch, a meter connected to the outlet of the pump, and a main register driven by the meter having a movable resetting member, the combination comprising a plurality of individual counters, key operated means including a clutch for connecting a selected individual counter to the main register drive, a lever mounted for movement with the key operated means connected to the resetting member of the main register, a catch for retaining the lever in actuated position, and means connected to the switch actuating member for releasing the catch.

21. In dispensing apparatus of the type having a pump, a pump motor for driving the pump, a pump motor switch, a movable switch actuating member for actuating the pump motor switch, a meter connected to the outlet of the pump, and a main register driven by the meter having a movable resetting member, the combination comprising a bank of individual counters mounted on the dispensing apparatus, a clutch associated with each individual counter for connecting the same to the main register drive, a slide extending between the individual counters operatively connected to the resetting member of the main register, key operated means associated with each counter for simultaneously engaging the associated clutch and moving the slide, a catch for retaining the slide in actuated position, and means connected to the switch actuating member for releasing the catch when the pump motor switch is opened.

22. In dispensing apparatus of the type having a pump, a pump motor for driving the pump, a pump motor switch, a movable switch actuating member for actuating the pump motor switch, a meter connected to the outlet of the pump, and a main register driven by the meter having a movable resetting member, the combination comprising a portable counter unit having a drive shaft and a manually operable key member, and a base unit mounted on the dispensing apparatus having a coupling for the drive shaft connected to the main register drive, a movable member operable by the key member connected to the resetting member of the main register, a catch for retaining the movable member in actuated position, and means connected to the switch actuating member for releasing the catch when the pump motor switch is opened.

23. In dispensing apparatus of the type having a pump, a pump motor for driving the pump, a pump motor switch, a movable switch actuating member for actuating the pump motor switch, a meter connected to the outlet of the pump, and a main register driven by the meter, the combination comprising an individual counter, key operated means for connecting the individual counter to the main register drive, a member mounted for oscillating movement and connected to the key operated means for movement therewith, a catch for holding the member in position assumed when the key operated means is unlocked, and means connected to the switch actuating member for releasing the catch.

24. In dispensing apparatus of the type having a flow establishing means, a flow measuring means, a flow control element and a main register having a drive connected to the flow measuring means, the combination comprising a plurality of individual counters, key operated means for connecting a selected individual counter to the main register drive, a member mounted for oscillating movement and connected to the key operated means for movement therewith, latching means for holding the last-named member in the position assumed when the key operated means is actuated to connect a selected individual counter to the main register drive, and means responsive to movement of the flow control element to release the latching means when the flow control element is moved to a flow stopping position.

References Cited in the file of this patent

UNITED STATES PATENTS

| | | |
|---|---|---|
| 1,439,904 | Lockwood | Dec. 26, 1922 |
| 2,024,492 | Wallace | Dec. 17, 1935 |
| 2,087,665 | Green | July 20, 1937 |
| 2,109,353 | Hazard | Feb. 22, 1938 |

UNITED STATES PATENT OFFICE
CERTIFICATE OF CORRECTION

Patent No. 2,838,237                                                    June 10, 1958

Harvey Lewis Spaunburg et al.

It is hereby certified that error appears in the printed specification of the above numbered patent requiring correction and that the said Letters Patent should read as corrected below.

Column 1, lines 22 and 23, strike out "298,045 filed December 14, 1953, now abandoned." and insert instead -- 398,045 filed December 14, 1953, now issued U. S. Patent No. 2,814,444 issued November 26, 1957. --; column 2, lines 23 and 24, strike out "298,045, now abandoned." and insert instead -- 398,045, now issued U. S. Patent No. 2,814,444. --; same column 2, line 47, strike out "298,045, now abandoned," and insert instead -- 398,045, now issued U. S. Patent No. 2,814,444, --.

Signed and sealed this 12th day of August 1958.

(SEAL)
Attest:

KARL H. AXLINE                                             ROBERT C. WATSON
Attesting Officer                                         Commissioner of Patents